United States Patent [19]

Stephen et al.

[11] Patent Number: 4,728,059
[45] Date of Patent: Mar. 1, 1988

[54] PRESSURIZED WALL IN AIRCRAFT

[75] Inventors: Gerhard Stephen, Bremen; Joachim Wrobel, Oyten, both of Fed. Rep. of Germany

[73] Assignee: MBB GmbH, Bremen, Fed. Rep. of Germany

[21] Appl. No.: 913,079

[22] Filed: Sep. 29, 1986

[30] Foreign Application Priority Data

Sep. 28, 1985 [DE]  Fed. Rep. of Germany ....... 3534719

[51] Int. Cl.$^4$ .................................................. B64C 1/10
[52] U.S. Cl. .................................... 244/119; 244/121; 244/129.1; 52/222; 220/3; 150/52 H
[58] Field of Search ............... 244/117 R, 125, 119, 244/129.1, 129.4, 121, 118.1; 410/117, 118; 220/3, 71; 150/52 H, 52 K; 52/222, 2

[56] References Cited

U.S. PATENT DOCUMENTS

| | | | |
|---|---|---|---|
| 1,219,125 | 3/1917 | Machmechen et al. | 244/125 |
| 2,109,529 | 3/1938 | Goddard | 220/3 |
| 2,669,402 | 2/1954 | Del Mar | 410/118 |
| 2,982,501 | 5/1961 | Griffith et al. | 244/119 |
| 3,910,447 | 10/1975 | Bevilacqua | 220/3 |
| 4,055,317 | 10/1977 | Greiss | 244/119 |
| 4,073,452 | 2/1978 | Gosau | 244/129.4 |

Primary Examiner—Galen Barefoot
Attorney, Agent, or Firm—Ralf H. Siegemund

[57] ABSTRACT

The internal wall such as the rear wall in the passenger compartment of a commercial aircraft, and separating compartments which are under different pressure, is rendered safe by providing a wall capturing net on the low pressure side of the wall and fastening that net to the fuselage proper.

2 Claims, 4 Drawing Figures

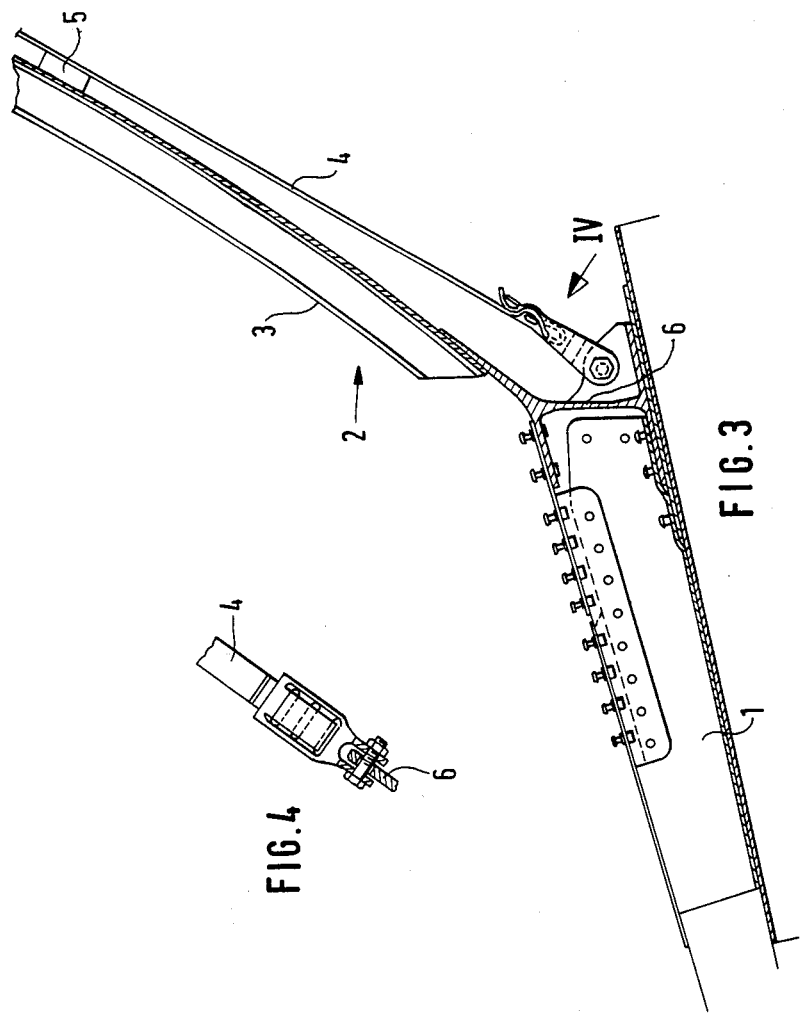

PRESSURIZED WALL IN AIRCRAFT

BACKGROUND OF THE INVENTION

The present invention relates to a pressure-proof wall or wall structure being part of a fuselage in an aircraft, the interior of which is pressurized relative to the environment and/or different parts of the interior, and more particularly, the invention relates to a tail end portion of a fuselage, particularly at and near a rear wall of the passenger compartment in a regular commercial aircraft.

Commercial aircraft or the like, usually require to maintain a pressure in the interior of the passenger compartment that is as near normal pressure as possible. This means that the structure of the aircraft experiences a significant excess pressure as compared with the environment, but a pressure differential exists also between different portions of the aircraft; there are compartments which do not require to be pressurized or require lower pressurization. In order to maintain this excess pressure in the passenger compartment, the fuselage has to be constructed accordingly, and those parts of that passenger compartment which do not require passenger compartment pressure, have to be separated from that compartment through appropriate, internal pressure-proof walls.

It is, therefore, customary in passenger-type commercial aircrafts, to block off the tail end of the passenger compartment from the true tail end of the aircraft through a particular internal pressure proof wall. This type of wall has to take up during flight a rather high load; even though the pressure differential is not that great and amounts to only about half a bar, the large area involved means that the total load on that wall is significant. This is, of course, particularly true in so-called wide body planes. Here then the forces that may arise are quite significant. These forces have to be reacted into the fuselage structure of the craft and should be distributed as widely as possible. On the other hand, in case of some damage, such as a leak or the like, the sudden escape of air from the passenger compartment can have a very detrimental effect on the safety of the craft, as some very sad recent experiences have proven.

DESCRIPTION OF THE INVENTION

It is an object of the present invention to improve a pressure wall construction, particularly of the kind which partitions various compartments in an aircraft, which are maintained under different pressure such, that in case of a damage, particularly of any kind of leakage somewhere, the safety of the craft is not endangered.

In accordance with the preferred embodiment of the present invention, it is suggested to provide the particular pressure or pressure-proof wall of interact on the low pressure side with a holding structure serving as safety equipment. In particular the holding equipment is to be constructed such that it provides additional support of that pressure-proof wall and for that reason, adds to the safety of that structure. Herein then, it is of advantage to provide the holding structure as a narrow meshed net which is fastened to the fuselage and tensioned against the pressure wall. Particularly the fastening of the net is such that, indeed, the net is tensioned against that wall. The net may be made of woven or braided belts which, in turn, are made, for example, of synthetic fibers known to have high load bearing capabilities (high tear strength). For reasons to be explained more fully below, certain spacers may be provided and distributed between the net and pressure walls.

DESCRIPTION OF THE DRAWINGS

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

FIG. 3 is a section as indicated by III in FIG. 2; and

FIG. 4 an enlarged detail as indicated by IV in FIG. 3.

Proceeding now to the detailed description of the drawings, FIG. 1 illustrates the tail end portion 2 of an aircraft 1 being, for example, a wide body plane. Herein, a particular internal pressure wall 33 is provided, having the shape of a spherical calotta. To the left of that wall 3 extends the passenger compartment with relatively high pressure, while the right-hand side of that wall 3 is the low pressure side, the pressure being somewhere in- between external pressure at high altitude and the compartment pressure.

The wall 3 actually functions as a bulk head. In accordance with the invention, a holding structure 4 is provided on the low pressure side of that wall 3. Details of this holding device are shown in the other figures.

Figure 1:
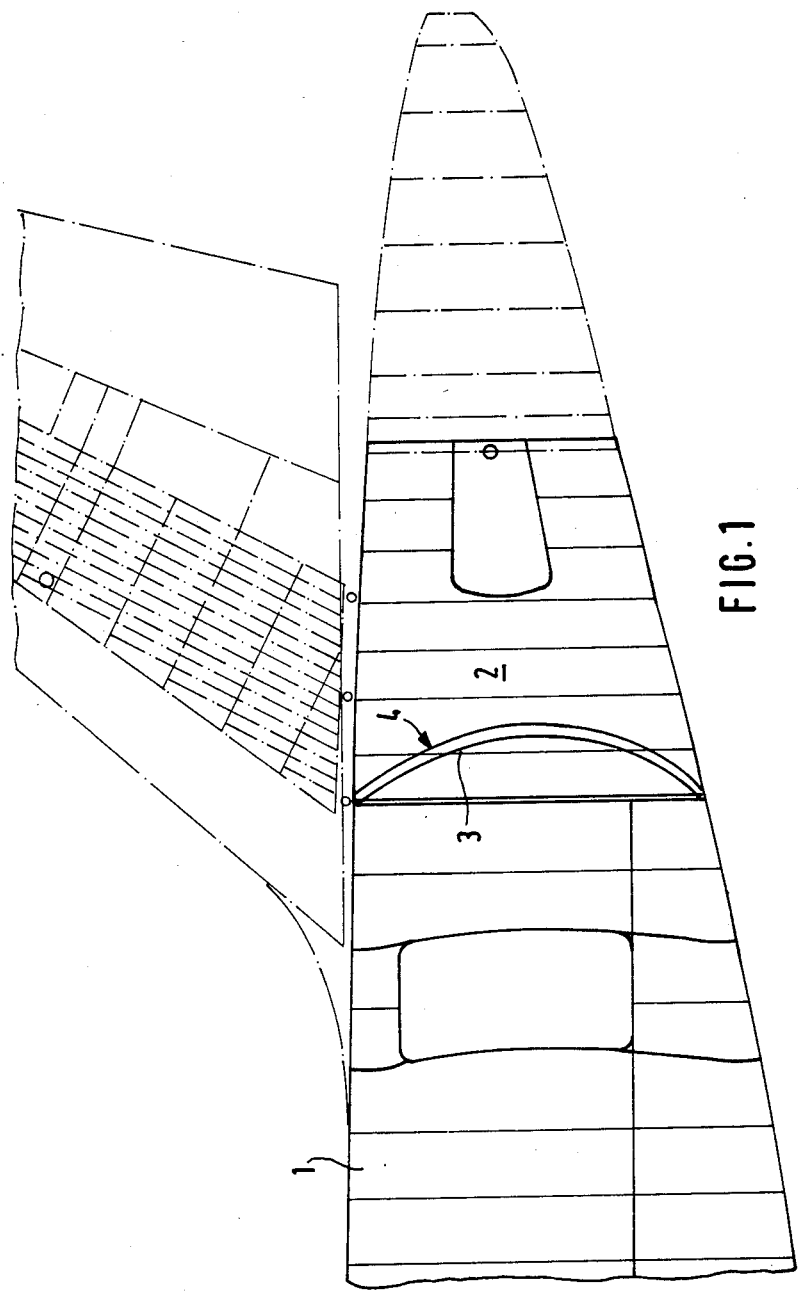
FIG. 1 is a somewhat schematic plane view of the tail portion of an aircraft.
Figure 2:
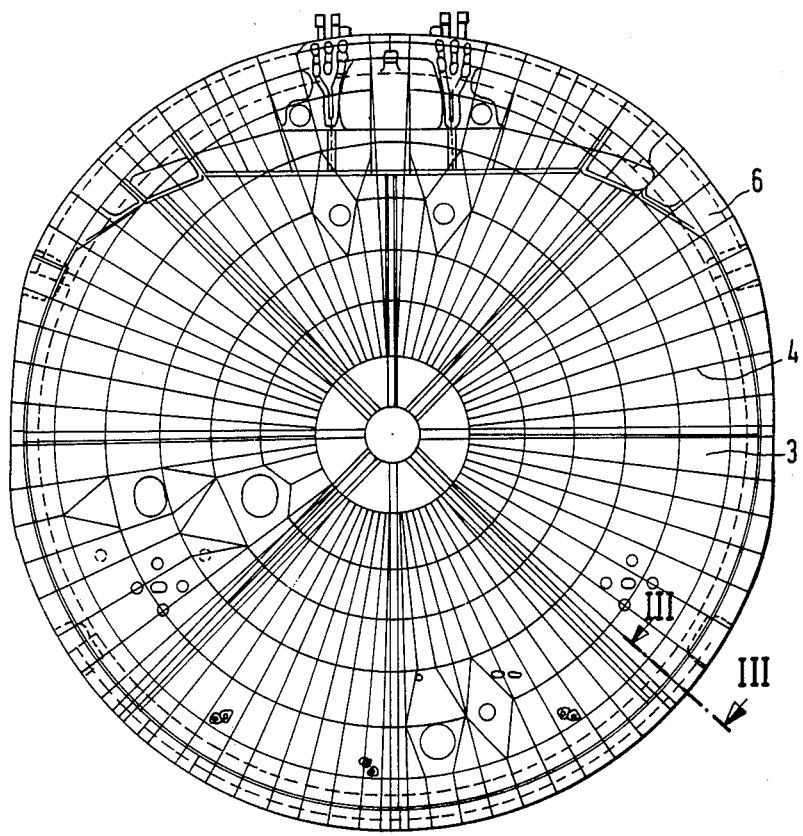
FIG. 2 is a side elevation of an internal wall structure improved in accordance with the preferred embodiment of the present invention for practicing the best mode thereof.

FIG. 2 illustrates a side elevation of that wall 3, as seen from the low pressure side as explained with reference to FIG. 1. The holding device 4, as can be seen from this drawing, is a net which extends over the entire surface of the wall 3, facing the low pressure side. The net is made of woven, braided, or the like, belts, which, in turn, are made of synthetic fibers or another suitable material, polyamide or the like is applicable here. The section III—III of FIG. 2, and as shown in FIG. 3, illustrates that between the net 4 and the wall 3 elastic spacers 5 are uniformly distributed. This way one obtains a uniform tension in and throughout the net such that the net will not be experiencing pressure load changes on the wall on account of any variable pressure differential.

FIGS. 3 and 4 now show the fastening of the net belts to the fuselage, particularly on spars, such as 6, to which the wall or bulk head 3 is fastened. As stated, the wall 3 is an internal one, and the connection of the net to these spars now provides for the reaction of forces that act on the net, into the fuselage.

The wall holding and capturing net 4, being constructed and provided as illustrated and described, establishes a holding and safety function for the wall 3. This means that in case of a damage somewhere, including the wall 3, the wall 3, even if dislodged, is safely supported through and captured by the net 4. The large plurality of individual support points established specifically by the spacers 5 distributes all forces equally upon the net. This way then, and particularly in the case of complete rupture, dislodging of the pressure wall, will be prevented. There is no interference with the equipment necessary for maintaining safe operation of the craft, so that the safety of the craft as such is not being endangered by such an internal mishap.

The invention is not limited to the embodiments described above, but all changes and modifications thereof, not constituting departures from the spirit and scope of the invention, are intended to be included.

We claim:

1. In combination with a partioning wall structure for walls in the interior of an aircraft, separating compartments being maintained under different pressure, such as the rear wall in a passenger compartment, the improvement comprising:

a holding and capturing structure comprised of a narrow meshed net fastened to the fuselage of the aircraft adjacent to points of the fuselage to which the wall is fastened such that the net is tensioned against said wall and being arranged on the low pressure side of said wall to serve as a safety and wall capturing structure; said net being made of woven or braided belts; the belts being made of synthetic material.

2. The improvement as in claim 1, there being resilient, uniformly distributed spacers provided between the net and the pressure walls.

* * * * *